No. 677,960. Patented July 9, 1901.
J. C. DOUGHERTY.
AUTOMATIC JOURNAL PROTECTING DEVICE.
(Application filed Apr. 3, 1901.)
(No Model.)
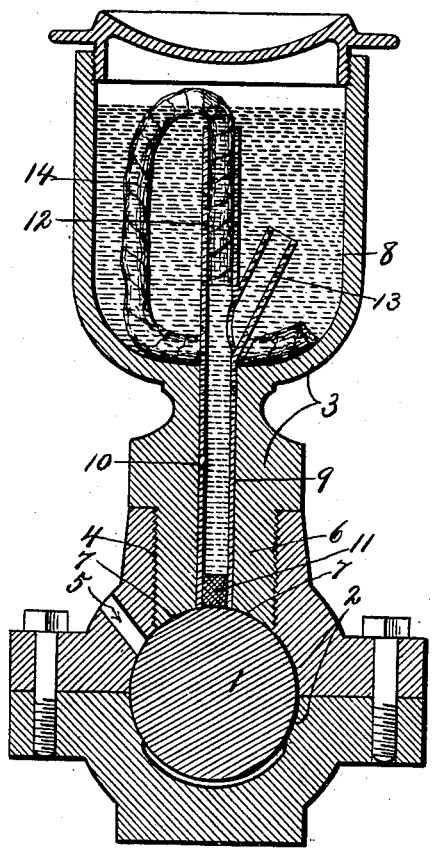
WITNESSES:
J.E. Arthur,
E. H. Benson.
INVENTOR
John C. Dougherty
BY
Smith & Denison
ATTORNEYS.

UNITED STATES PATENT OFFICE.

JOHN C. DOUGHERTY, OF LONGVALLEY, PENNSYLVANIA.

AUTOMATIC JOURNAL-PROTECTING DEVICE.

SPECIFICATION forming part of Letters Patent No. 677,960, dated July 9, 1901.

Application filed April 3, 1901. Serial No. 54,206. (No model.)

*To all whom it may concern:*

Be it known that I, JOHN C. DOUGHERTY, of Longvalley, in the county of Bradford, in the State of Pennsylvania, have invented new and useful Improvements in Automatic Journal-Protecting Devices, of which the following, taken in connection with the accompanying drawing, is a full, clear, and exact description.

My invention relates to improvements in automatic journal-protecting devices.

The object of this invention is to provide means whereby a heated bearing or journal will automatically cause a flow of lubricant, as oil, thereto and in which the oil is held in reserve for such overheated condition of the bearing—as, for instance, when an attendant fails to lubricate the bearing at regular intervals and the bearing becomes heated the oil in a suitable reservoir will be automatically fed to the bearing for preventing injury thereto.

To this end the invention consists in the combination, construction, and arrangement of the parts of a bearing and an automatically-controlled oil-feed, as hereinafter fully described, and pointed out in the claims.

In the drawing I have shown a transverse vertical sectional view of a shaft and bearing and my invention as applied thereto, in which 1 represents the shaft, 2 the bearing for the shaft, and 3 is an oil cup or reservoir secured to the bearing.

The shaft 1 may be of any desired size, and the bearing 2 is provided with a threaded opening 4, communicating with the shaft-opening, and is also formed with an oil-passage 5, also communicating with the shaft-opening for receiving a lubricant in the usual manner.

The oil cup or reservoir 3 is provided with a hollow threaded shank 6, engaged with the threaded opening 4, the lower end of said shank being provided with a concave bearing-face 7, normally engaged with the periphery of the shaft. The upper end of the reservoir is also hollow, is formed of greater diameter than the lower end, and is arranged to receive a quantity of oil for lubricating the shaft 1 and its bearing 2. The oil-containing chamber 8 communicates with the shaft-opening of the bearing 2 through a substantially central passage 9, in which is arranged a tube 10, the lower end of said tube being arranged in close proximity to the shaft 1 and is closed by a fusible plug 11, also bearing upon the shaft 1. This tube extends upwardly through the passage 9 into the oil-containing reservoir 8 and is provided at its upper end with diverging branches 12 and 13, the branch 12 forming a continuation of the tube and extending upwardly a greater distance than the branch 13, its upper end being arranged to receive a suitable wick 14. The branch 13 is somewhat shorter than the branch 12, being joined to the tube 10 at a point in proximity to the upper end of the passage 9 or, rather, in proximity to the base of the reservoir 8.

The fusible plug 11 closes the lower end of the tube 10 and usually consists of soft solder or other material which may be melted at a low temperature, so that should the shaft 1 or bearing 2 become heated to a sufficient degree, owing to the neglect of the attendant to properly lubricate said bearings, the plug 11 will be readily fused or liquefied by the heat of the shaft and flow out of the lower end of the tube, thereby admitting the oil to said shaft and bearing, it being understood that the liquefying of the fusible plug causes the same to flow into the bearing, and thus remove the obstruction to the flow of the oil from the reservoir 8.

The branch conduit 13 is so arranged as to feed a certain amount of oil through the tube 10 when said plug is fused or liquefied and serves as a direct oil-supply under such conditions.

The wick 14, as previously stated, is inserted in the upper end of the branch 12, its lower end terminating in a plane above the junction of the branch 13 with the tube 10 and its other end being arranged in the bottom of the reservoir for absorbing any remaining oil in the reservoir and conveying the same within the tube 10.

As previously stated, the lower face of the oil-cup or its shank 6 is concaved for the purpose of forming a broad bearing upon the shaft, which when said shaft becomes heated it is also heated to substantially the same degree, and thereby facilitates the fusing of the plug 11.

The operation of my invention will now be readily understood upon reference to the foregoing description and the accompanying drawing, and it will be noted that some change may be made in the detail construction of the cup without departing from the spirit of this invention, the essential parts of which are the tube 10, having branch inlets at its upper end and a fusible plug at its lower end, in combination with the oil-cup, having a concave bearing-face adapted to engage the shaft.

Having thus fully described my invention, what I claim, and desire to secure by Letters Patent, is—

1. The herein-described oil-cup having branch oil-passages converging into a single passage at the base of the cup and a fusible plug closing the lower end of the single passage.

2. The herein-described oil-cup having branch oil-passages converging into a single passage at the base of the cup, the lower face of the cup being formed with a concave groove for the purpose set forth, a wick in one of the branch passages, and a fusible plug closing the lower end of the single passage.

3. An oil-cup comprising an enlarged oil-containing receptacle having a reduced opening in its base, a tube inserted in said reduced opening and extended into the enlarged chamber, and a branch tube leading from the former tube into said enlarged chamber, a wick in one of the tubes above their junction and a fusible plug closing the lower end of the former tube.

In witness whereof I have hereunto set my hand this 16th day of March, 1901.

JOHN C. DOUGHERTY.

Witnesses:
  MILDRED M. NOTT,
  HOWARD P. DENISON.